(12) United States Patent
Gunasekara et al.

(10) Patent No.: US 7,688,680 B1
(45) Date of Patent: Mar. 30, 2010

(54) SYSTEMS AND METHODS FOR VISUAL LIGHT COMMUNICATION IN AN UNDERWATER ENVIRONMENT

(75) Inventors: Don Gunasekara, Reston, VA (US); Tom Wilson, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 126 days.

(21) Appl. No.: 12/018,551

(22) Filed: Jan. 23, 2008

(51) Int. Cl.
*H04B 11/00* (2006.01)
(52) U.S. Cl. ..................................... 367/134
(58) Field of Classification Search ................. 367/134
See application file for complete search history.

(56) References Cited

U.S. PATENT DOCUMENTS

| | | | |
|---|---|---|---|
| 5,894,450 A * | 4/1999 | Schmidt et al. ............. 367/134 |
| 6,058,071 A * | 5/2000 | Woodall et al. ................. 367/3 |
| 6,813,218 B1 * | 11/2004 | Antonelli et al. ................. 367/3 |
| 2004/0066313 A1 * | 4/2004 | Ong et al. ............... 340/870.11 |
| 2006/0067707 A1 | 3/2006 | Maniam et al. |
| 2007/0147843 A1 | 6/2007 | Fujiwara |

* cited by examiner

*Primary Examiner*—Dan Pihulic

(57) ABSTRACT

Systems and methods for visual light communication in an underwater environment are provided. The system can include a master control station that determines an amount of impairment of a water medium and selects one of a wired and wireless communication transceiver for exchanging communications with communication device located in the water. The system can also include a first gateway that exchanges radio frequency signals with the master control station and provides visual light communication signals to devices located in the water. The system can also include a second gateway that can exchange both visual light communication signals and acoustic communication signals with other devices located in the water.

18 Claims, 11 Drawing Sheets

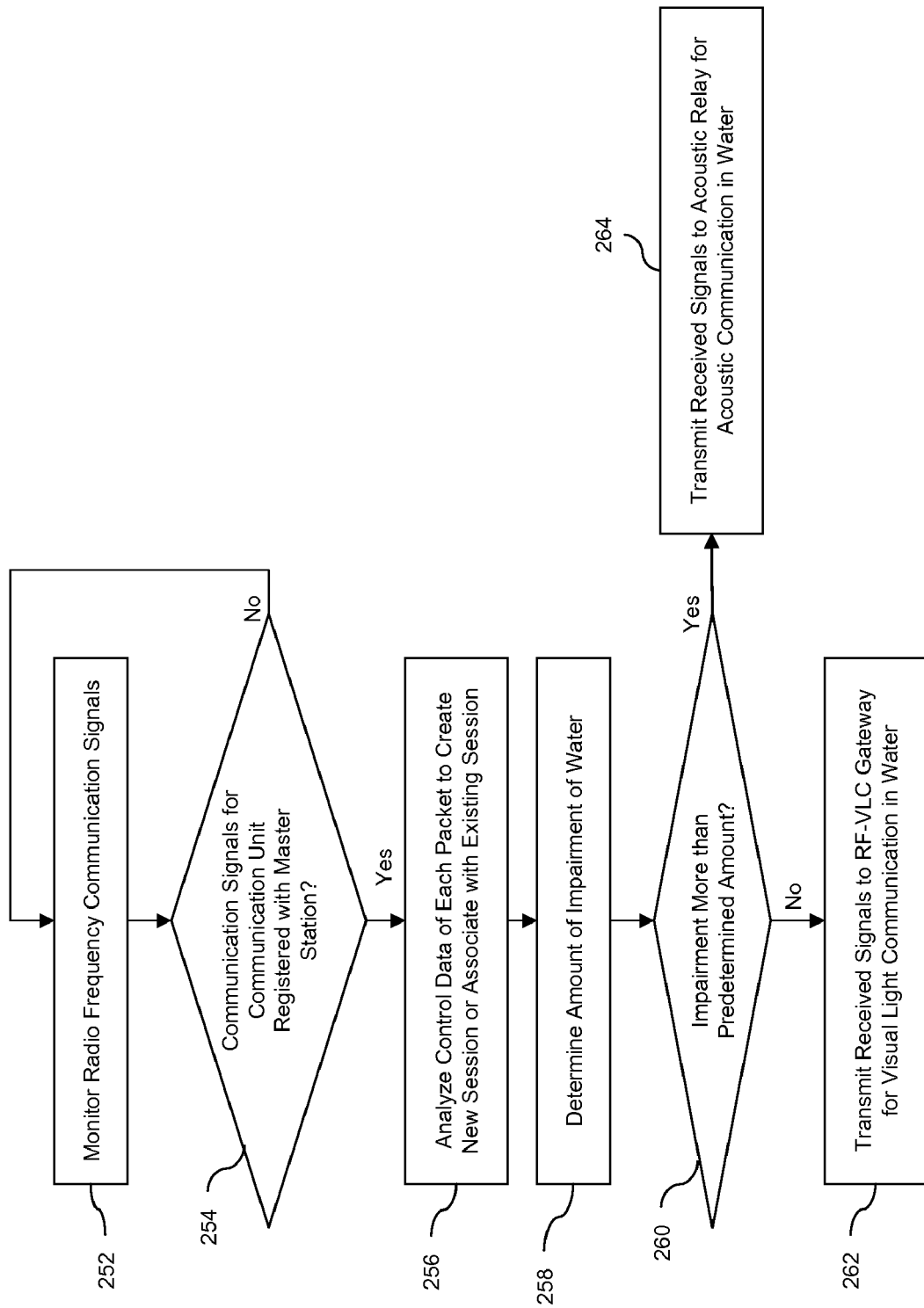

SYSTEMS AND METHODS FOR VISUAL LIGHT COMMUNICATION IN AN UNDERWATER ENVIRONMENT

CROSS-REFERENCE TO RELATED APPLICATIONS

This application is related to U.S. patent application Ser. No. 11/968,824, filed Jan. 3, 2008, entitled "Systems and Methods for Visual Light Communication." The entire disclosure of the aforementioned related application is herein expressly incorporated by reference.

BACKGROUND OF THE INVENTION

Communications can be performed using both wired and wireless communication media. Each media provides a variety of different mechanisms for carrying communications. For example, wired communications can travel over conventional twisted pair wires, category 5 or 6 wires or fiber optic cables. Wireless communications can be performed using radio frequencies, infrared frequencies, sonar and/or the like.

SUMMARY OF THE INVENTION

Exemplary embodiments of the present invention are directed to systems and methods of performing visual light communications in an underwater environment. An exemplary system includes a master control station arranged to transmit communications using wired and wireless communication mediums. An acoustic relay is arranged to exchange communication signals with the master control station using the wired communication medium and to convert the communication signals into acoustic communication signals. A first gateway is arranged to convert radio frequency communications received from the master control station into visual light communication signals. A second gateway is arranged to convert visual light communication signals into acoustic signals and acoustic signals into visual light communication signals. A communication device arranged to exchange visual light communication signals with one of the first and second gateways.

Other objects, advantages and novel features of the present invention will become apparent from the following detailed description of the invention when considered in conjunction with the accompanying drawings.

BRIEF DESCRIPTION OF THE DRAWING FIGURES

FIG. 2B is a flow diagram of an exemplary method for a master control station in accordance with the present invention;

DETAILED DESCRIPTION OF THE PREFERRED EMBODIMENTS

Figure 1:
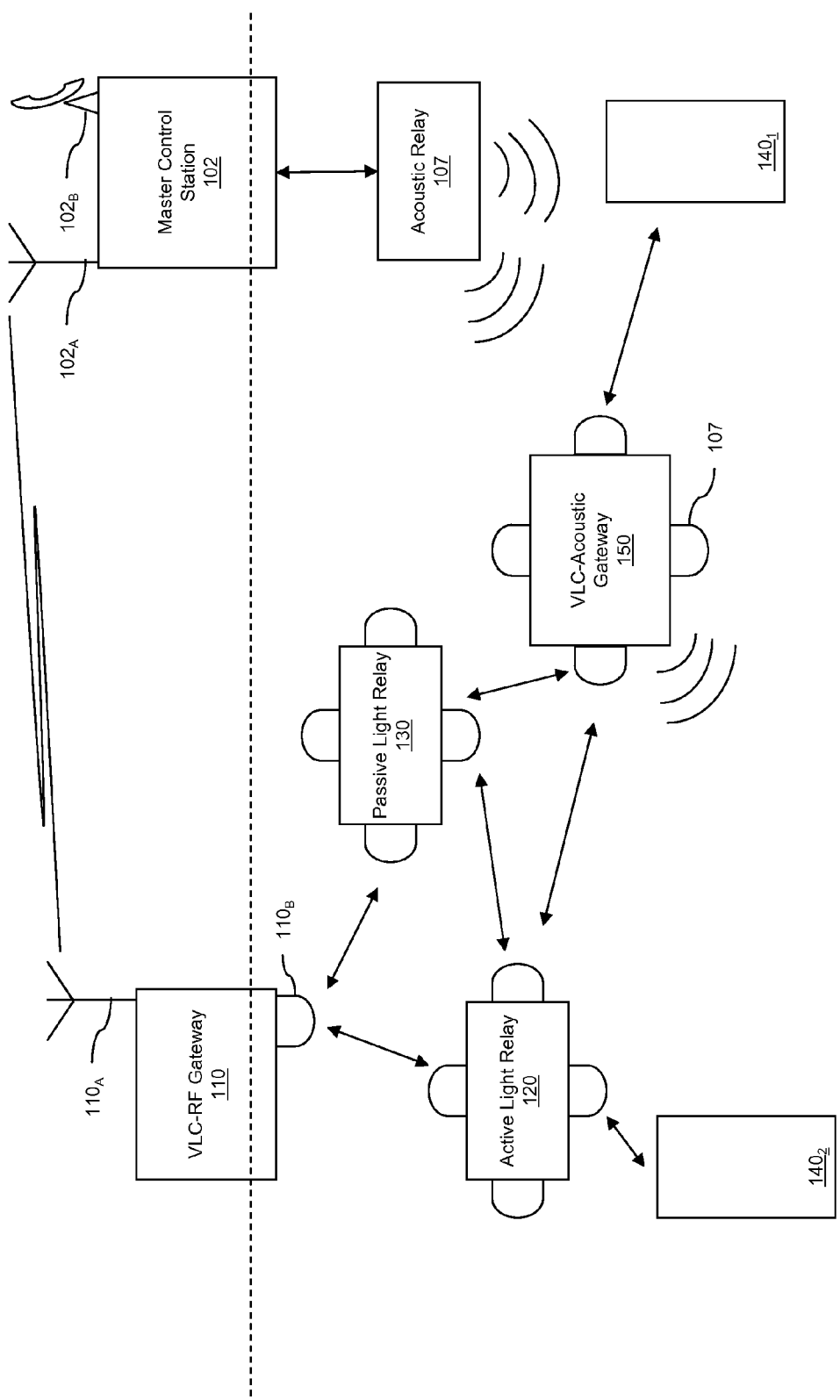
FIG. 1 is a block diagram of an exemplary system in accordance with the present invention.

FIG. 1 is a block diagram of an exemplary system in accordance with the present invention. The system includes master control station 102, acoustic relay 107, visual light communications-radio frequency (VLC-RF) gateway 110, one or more active light relays 120, one or more passive light relays 130, a visual light communications-acoustic (VLC-Acoustic) gateway 150, and one or more communication devices 140$_1$ and 140$_2$, the detailed operation of each of these components will be described below in connection with FIGS. 2A-7B. The dashed line in FIG. 1 represents a surface of a body of water, and as illustrated in the Figure, master control station 102 and VLC-RF gateway 110 are partially submerged in the water, whereas acoustic relay 107, active light relay 120, passive light relay 130, communication devices 140$_1$ and 140$_2$, and VLC-Acoustic gateway 150 are located under the surface of the water.

Generally, master control station 102 receives communication signals from satellites and/or a terrestrial communication network (e.g., a wireless macro network) using antenna 102$_B$, and transmits the signals to VLC-RF gateway 110 using antenna 102$_A$ and/or transmits the signals to acoustic relay 107. Acoustic relay 107 can transmit the communication signals to any of the devices 120-150 using acoustic signals. The use of acoustic signals in an underwater environment is well known in the art, and a detailed explanation of such is omitted.

VLC-RF gateway 110 can transmit the communication signals received from master control station 102 using visual light communications to any of devices 120-150. Active light relay 120, passive light relay 130 and VLC-Acoustic gateway 150 can exchange communication signals with any of devices 120-150 using visual light communications, and VLC-Acoustic gateway 150 can also exchange communication signals with acoustic relay 107 and/or communication devices 140$_1$ and/or 140$_2$ using acoustic signals. Communication signals (either acoustic or visual light) from devices located in the water can be provided to a terrestrial and/or satellite communication network using master control station 102.

Figure 2A:
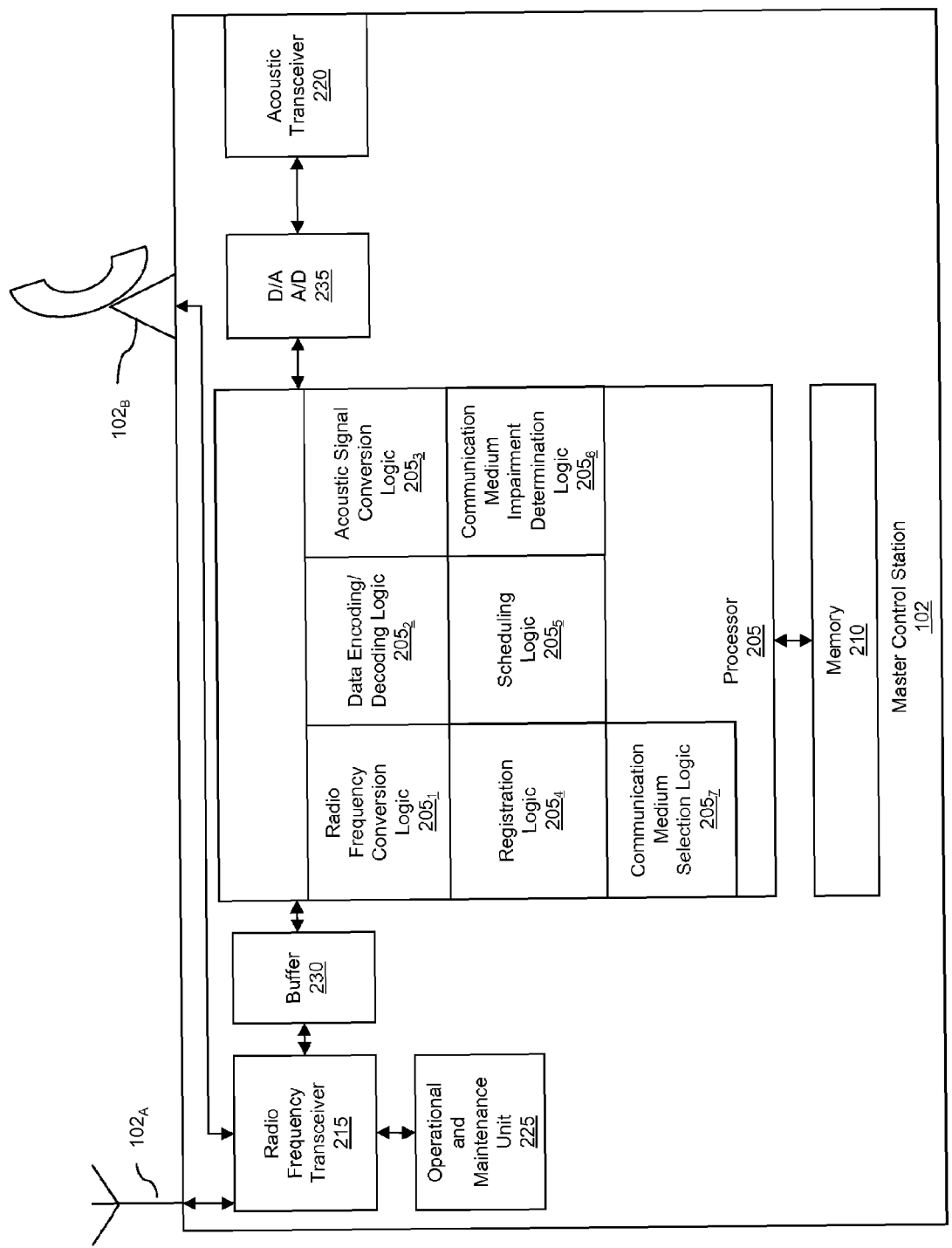
FIG. 2A is a block diagram of an exemplary master control station in accordance with the present invention.

FIG. 2A is a block diagram of an exemplary master control station in accordance with the present invention. Master control station 102 includes antenna 102$_A$ for exchanging radio frequency signals with VLC-RF gateway 110, and antenna 102$_B$ for exchanging radio frequency signals with a terrestrial and/or satellite communication network (not illustrated). Signals received from VLC-RF gateway 110 are provided to radio frequency transceiver 215. Radio frequency transceiver 215 includes the functionality for communicating with the VLC-RF gateway 110, and provides received communication signals to buffer 230, which in turn provides the signals to processor 205. Gateway 110 and master control station 102 can employ any type of wireless technology for communication, including, but not limited to, TDMA, CDMA, OFDM and/or the like.

Processor 205 includes logic $205_1$-$205_7$, and is coupled to memory 210. Processor 205 can be any type of processor, such as a microprocessor, field programmable gate array (FPGA) and/or an application specific integrated circuit (ASIC). When processor 205 is a microprocessor then logic $205_1$-$205_7$ can be processor-executable code loaded from memory 210. Logic $205_1$ converts the radio frequency signals received from antenna $102_A$ and/or $102_B$ into baseband signals, and logic $205_2$ decodes the baseband signals. When the decoded baseband signals correspond to signals received from a terrestrial and/or satellite network by antenna $102_B$, the signals can be reconverted into radio frequency signals using logic $205_1$ and $205_2$ and/or be converted into acoustic signals using logic $205_2$ and $205_3$. The acoustic signals are provided to digital-to-analog/analog-to-digital (D/A-A/D) converter 235, which is then provided to acoustic transceiver 220 for transmission as acoustic signals within the water.

Acoustic signals received by acoustic transceiver 220 are converted to baseband signals by logic $205_3$, encoded by logic $205_2$ and converted to radio frequency signals by logic $205_1$. Processor 205 then provides the signals to buffer 330, which can then transmit the signals to VLC-RF gateway 110 using antenna $102_A$ and/or a terrestrial or satellite network using antenna $102_B$.

Processor 205 also includes registration logic $205_4$ that controls registration of communication devices in the VLC network, and stores the registration information in memory 210. Alternatively, the registration information can be stored in a separate component coupled to the master control station.

Processor 205 further includes scheduling logic $205_5$ that controls the scheduling of packets based on information received from operational and maintenance unit 225. Operational and maintenance unit 225 manages the powering on and off of the master control station, clearing the station's memory, and providing status updates to a terrestrial and/or satellite communication network. Processor also includes logic $205_6$ and $205_7$, which determines an amount of impairment in the water and selects either acoustic signals for communication (using acoustic relay 107) or visual light communication signals using VLC-RF gateway 110.

The operation of master control station 102 will now be described with reference to FIGS. 2A and 2B. Master control station 102 monitors communication signals of a terrestrial and/or satellite network (not illustrated), and determines whether any of the communications signals are intended for a communication unit registered with the master control station (steps 252 and 254). When there are no communication signals for communication units registered in the network ("No" path out of decision step 254), then master control station 102 continues to monitor communication signals of the terrestrial and/or of satellite network (step 252).

Registering communication devices as being supported by the master control station 102 can be performed using any number of different techniques. For example, the terrestrial and/or satellite network can store the registration information in a home location register indicating that the communication devices are supported by master control station 102, and incoming communications for one of the communication devices will be forwarded to master control station 102. Alternatively, the terrestrial and/or satellite network can store the registration information in a home location register (or any equivalent type of information database) indicating that the communication devices are supported by a base station or satellite that is in radio frequency range of master control station 102. Incoming communications for one of the communication devices will be forwarded to the base station or satellite, which will transmit the signals to master control station 102. In either case, master control station 102 can include registration logic to maintain information regarding the communication devices it supports.

When master control station 102 receives communication signals that are intended for communication units registered with the master control station ("Yes" path out of decision step 254), then the master control station analyzes control data of each packet in order to create a new session or associate the packet with an existing session (step 256). Logic $205_6$ then determines an amount of impairment of the water (step 258). Specifically, the water may be relatively clear or murky, and visual light communications are employed when the water is clear enough to allow transmission of the visual light more than a predetermined distance, and acoustic communications are employed when the water is murky enough that visual light cannot be transmitted more than a predetermined distance. The actual distance corresponding to the predetermined distance can be selected based on the particular implementation of the system.

When the determined amount of impairment is more than a predetermined amount of impairment ("Yes" path out of decision step 260), then logic $205_7$ selects acoustic signals as the technique for underwater communication, and master control station 102 provides the received signals to acoustic relay 107 for acoustic communication in the water (step 264). When, however, the determined amount of impairment is less than a predetermined amount ("No" path out of decision step 260), then logic $205_7$ selects visual light communication as the technique for underwater communication, and master control station 102 transmits the received signals to RF-VLC gateway 110 for visual light communication in the water (step 262). The received signals can be transmitted to either of the acoustic relay 107 or RF-VLC gateway based on scheduling information, which is employed to provide differentiated quality of service (QoS) for communication devices supported by the visual light communication network.

Figure 3A:
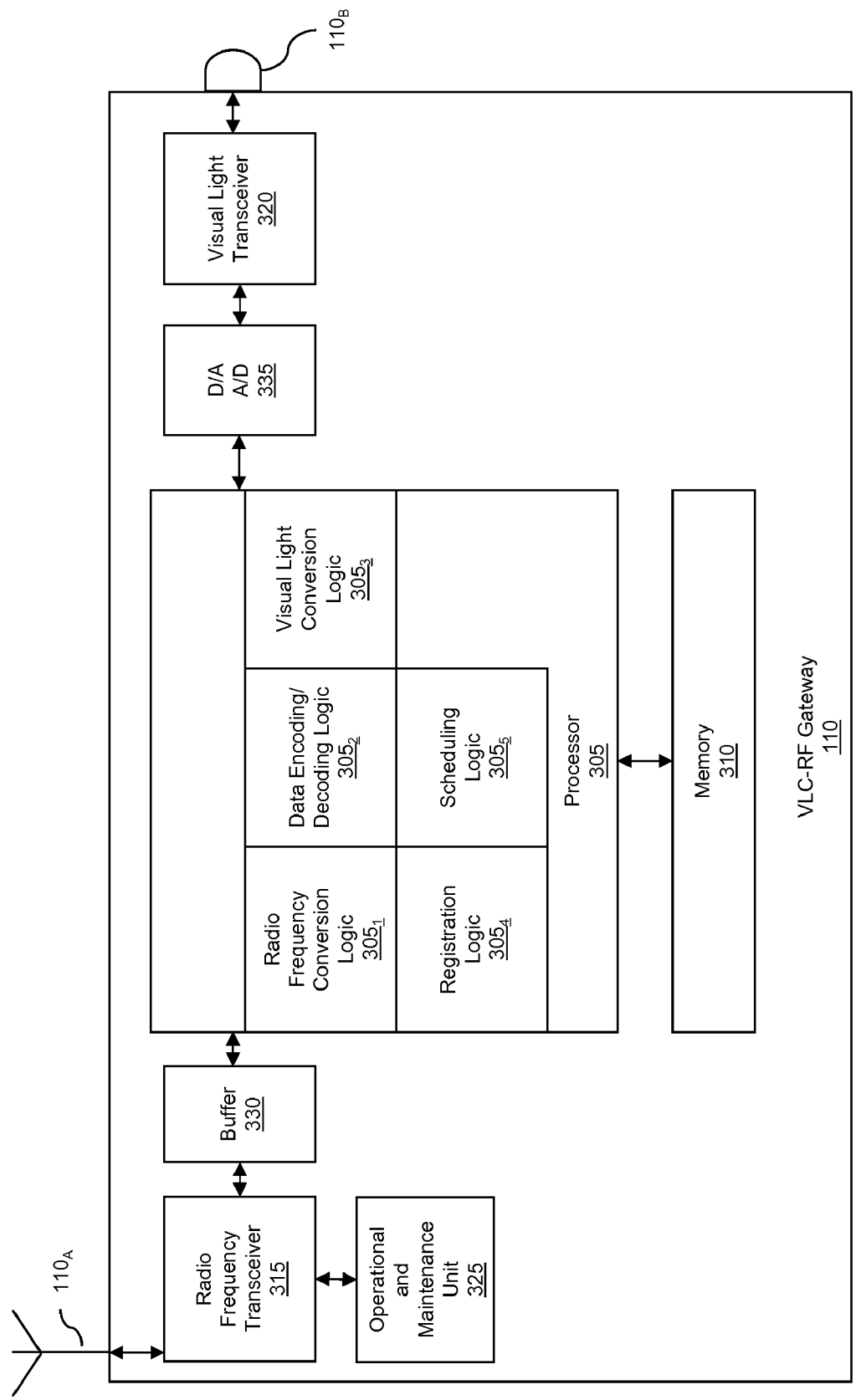
FIG. 3A is a block diagram of an exemplary visual light communication-radio frequency (VLC-RF) gateway in accordance with the present invention.

FIG. 3A is a block diagram of an exemplary VLC-RF gateway in accordance with the present invention. Gateway 110 includes antenna $110_A$ that receives radio frequency signals from master control station 102 and provides the signals to radio frequency transceiver 315. Radio frequency transceiver includes the functionality for communicating with the master control station 102, and provides received communication signals to buffer 330, which in turn provides the signals to processor 305.

Processor 305 includes logic $305_1$-$305_5$, and is coupled to memory 310. Processor 305 can be any type of processor, such as a microprocessor, field programmable gate array (FPGA) and/or an application specific integrated circuit (ASIC). When processor 305 is a microprocessor then logic $305_1$-$305_5$ can be processor-executable code loaded from memory 310. Logic $305_1$ converts the radio frequency signals received from master control station 102 into baseband signals, and logic $305_2$ decodes the baseband signals. The decoded baseband signals are then converted into visual light communication signals by logic $305_3$, and provided to D/A-A/D converter 335. D/A-A/D converter 335 provides the signals to visual light transceiver 320, which then transmits the visual light communication signals using light source/sensor 110B. Light source/sensor 110B can include a light source that can be, for example, a light emitting diode, and a separate light sensor, such as a photo diode array.

Visual light communication signals received by light source/sensor 110B are converted to baseband signals by logic $305_3$, encoded by logic $305_2$ and converted to radio frequency signals by logic $305_1$. Processor 305 then provides the signals to buffer 330, which can then transmit the signals to master control station 102 using radio frequency transceiver 315 and antenna 110$_A$.

Processor 305 also includes registration logic 305$_4$ that controls registration of communication devices in the underwater network, and stores the registration information in memory 310. Alternatively, the registration information can be stored in a separate component coupled to gateway 110. It should be recognized that registration logic can be omitted when the system includes only one VLC-RF gateway, and the registration function can be performed by the master control station 102.

Processor 305 further includes scheduling logic 305$_5$ that controls the scheduling of packets based on information received from operational and maintenance unit 325. Operational and maintenance unit 325 manages the powering on and off of the gateway, clearing the gateway memory, providing status updates to master control station 102.

Figure 3B:
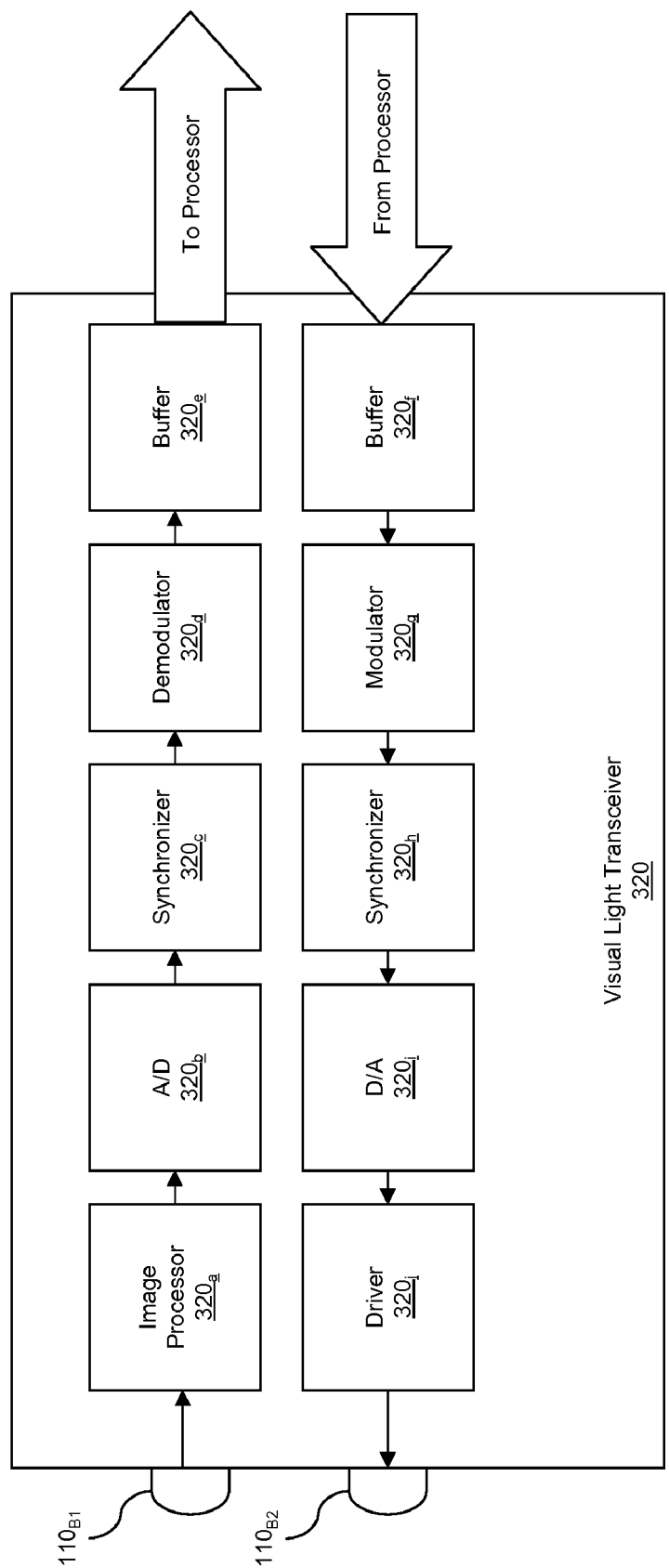
FIG. 3B is a block diagram of an exemplary visual light transceiver in accordance with the present invention.

FIG. 3B is a block diagram of an exemplary visual light transceiver in accordance with the present invention. The visual light transceiver of FIG. 3B is arranged to receive visual light communication signals and provide those signal to processor 305, and receive signals from processor 305 for transmission as visual light communication signals under the water. Specifically, visual light communication signals received by light sensor 110$_{B1}$ are provided to image processor 320$_a$, and converted from analog to digital by block 320$_b$. Block 320$_c$ synchronizes the signals, and block 320$_d$ demodulates the received signals and supplies the signals to buffer 32$_e$%, which in turn provides the signals to processor 305. The synchronization of signals is performed in order to recover data from the received signal, where the waveforms carrying the data across the communication interface may have been distorted during transmission. Synchronization can be performed using any number of different techniques, including detecting framing bits that are included with the transmitted signal, using training sequences that are included with the transmitted signal, and/or the like.

Signals received from processor 305 are provided to buffer 320$_f$, which provides the signals to modulator 320$_g$. The modulated signals are then synchronized by block 320$_h$, converted from analog to digital by block 320$_i$, and output by light source 110$_{B2}$, which is controlled by driver 320$_j$.

Figure 4A:
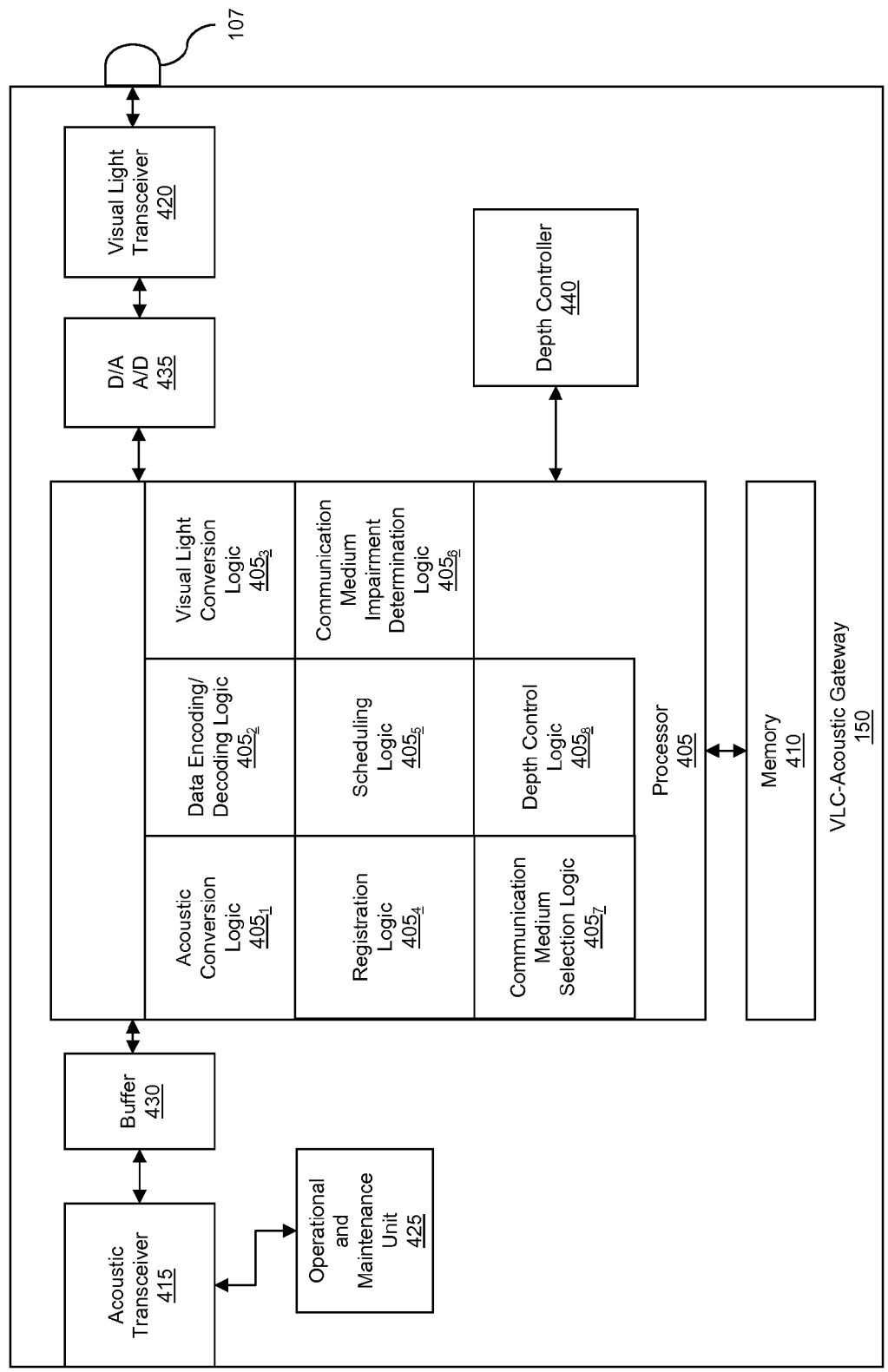
FIG. 4A is a block diagram of an exemplary visual light communication-acoustic (VLC-Acoustic) gateway in accordance with the present invention.

FIG. 4A is a block diagram of an exemplary visual light communication-acoustic (VLC-Acoustic) gateway in accordance with the present invention. VLC-Acoustic gateway 150 is located under the surface of the water, can perform communications using both visual light and acoustic signals, and can convert communication signals between these two technologies. Specifically, acoustic transceiver 415 can transmit and receive acoustic communication signals, and provide/receive communication signals to/from buffer 430. Similarly, visual light transceiver 420 can transmit and receive visual light communication signals, and provide/receive communication signals to/from D/A-A/D converter 435. Visual light communications are transmitted/received using light source/sensor 107. Although FIG. 4A illustrates single light source/sensor and a single visual light transceiver, the gateway can include more than one light sources/sensors and/or more than one transceiver.

VLC-Acoustic gateway also includes an operational and maintenance unit 425 coupled to acoustic transceiver 415. Operational and maintenance unit 425 can perform similar functions to those discussed above with regard to operational and maintenance unit 425 of VLC-RF gateway 110. Gateway 150 further includes processor 405 coupled to buffer 430, D/A-A/D converter 435, memory 410 and depth controller 440. Processor 405 includes logic 405$_1$-405$_8$, which will be described in more detail below. Processor 405 can be any type of processor, such as a microprocessor, field programmable gate array (FPGA) and/or an application specific integrated circuit (ASIC). When processor 405 is a microprocessor then logic 405$_1$-405$_8$ can be processor-executable code loaded from memory 410.

Depth control logic 405$_8$ can control the depth of VLC-Acoustic gateway 150 in conjunction with depth controller 440. The depth can be controlled based on instructions received from VLC-RF gateway 110 and/or master control station 102. VLC-Acoustic gateway 150 can also adjust its depth independent of instructions from VLC-RF gateway 110 and/or master control station 102. For example, VLC-Acoustic gateway 150 can control its depth in order to optimize transmission and/or receipt of communication signals.

Figure 4B:
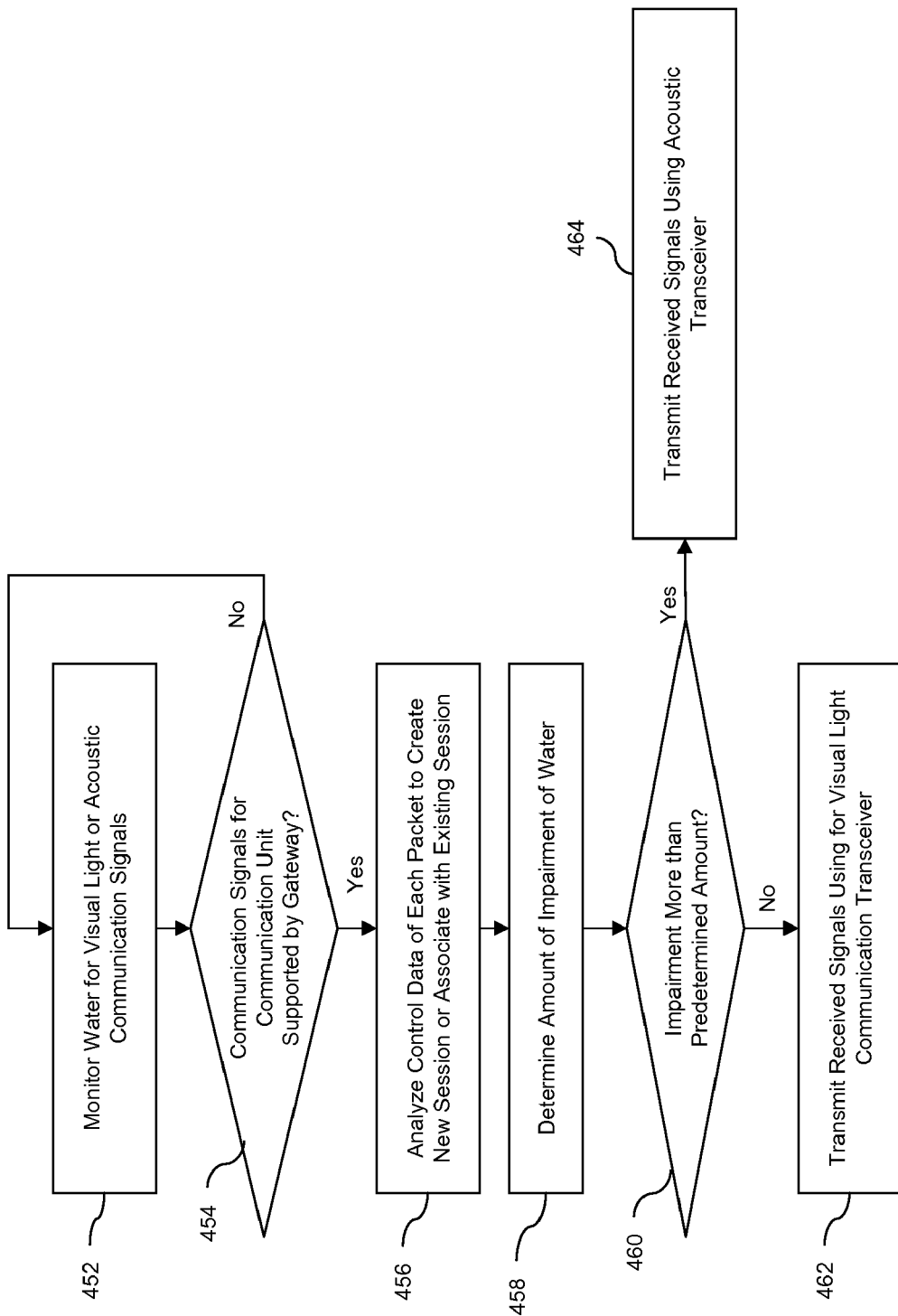
FIG. 4B is a flow diagram of an exemplary method for the VLC-Acoustic gateway in accordance with the present invention.

FIG. 4B is a flow diagram of an exemplary method for the VLC-Acoustic gateway in accordance with the present invention. VLC-Acoustic gateway 150 monitors the water for visual light and/or acoustic communication signals, and determines whether any of the communications signals are intended for a communication unit registered with the gateway (steps 452 and 454). When there are no communication signals for communication units registered with the gateway ("No" path out of decision step 454), then VLC-Acoustic gateway 150 continues to monitor the water for communication signals (step 452). VLC-Acoustic gateway 150 can store registration information for communication units in memory 410.

When VLC-Acoustic gateway 150 receives communication signals that are intended for communication units registered with the gateway ("Yes" path out of decision step 454), then the gateway analyzes control data of each packet in order to create a new session or associate the packet with an existing session (step 456). Logic 405$_6$ then determines an amount of impairment of the water (step 458). When the determined amount of impairment is more than a predetermined amount of impairment ("Yes" path out of decision step 460), then logic 405$_7$ selects acoustic signals as the technique for communication, and VLC-Acoustic gateway 150 transmits the communications using acoustic signals (step 464). When, however, the determined amount of impairment is less than a predetermined amount ("No" path out of decision step 460), then logic 405$_7$ selects visual light communications as the technique for communication and VLC-Acoustic gateway 150 transmits the received signals to using visual light signals (step 462). The received signals can be transmitted based on scheduling information, which is employed to provide differentiated quality of service (QoS) for communication devices supported by the visual light communication network.

Figure 5:
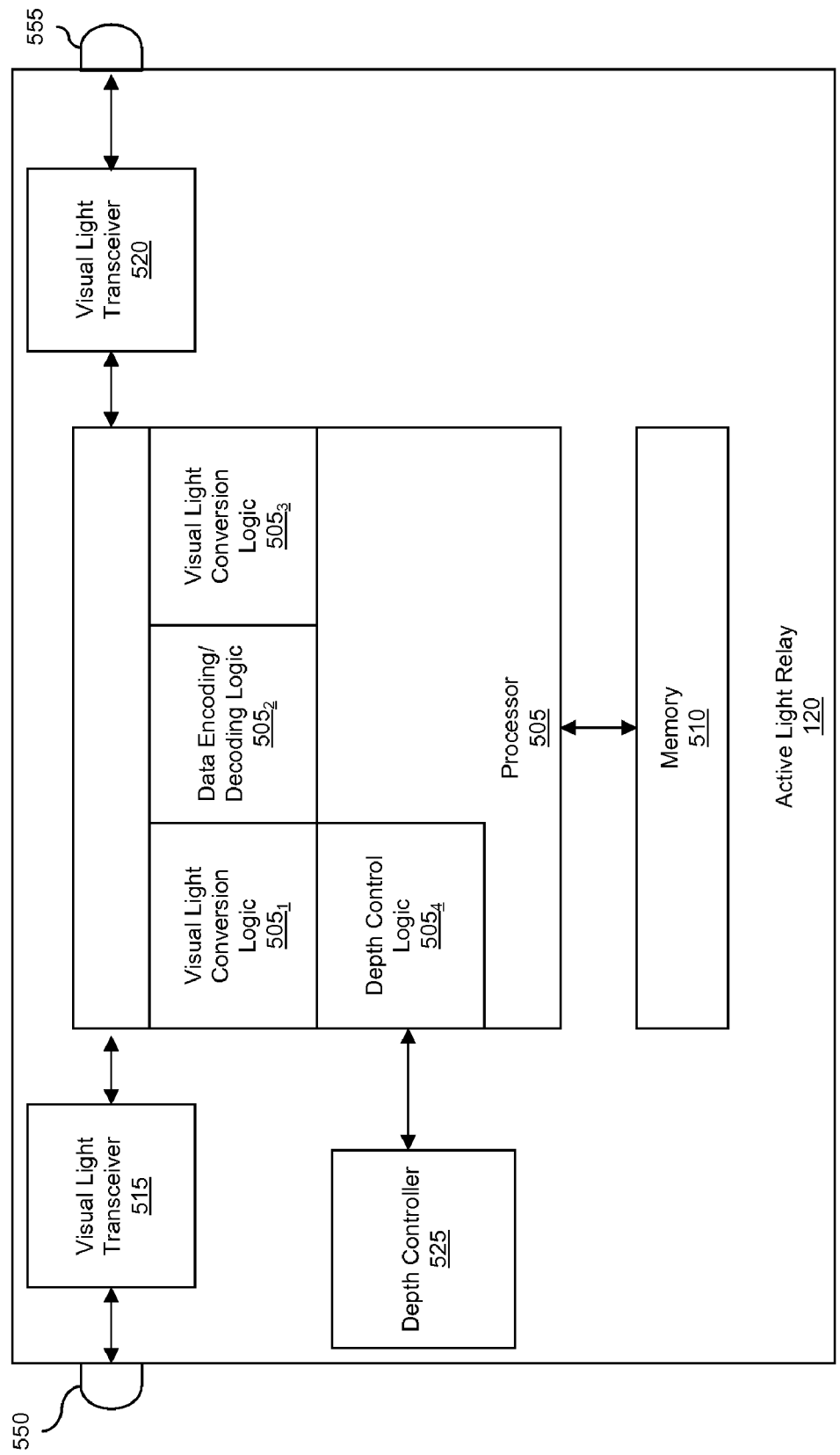
FIG. 5 is a block diagram of an exemplary active relay in accordance with the present invention.

FIG. 5 is a block diagram of an exemplary active light relay in accordance with the present invention. The active light relay 120 includes a processor coupled between memory 510 and visual light transceivers 515 and 520. Processor 505 includes logic 505$_1$-505$_4$. Processor 505 can be any type of processor, such as a microprocessor, field programmable gate array (FPGA) and/or an application specific integrated circuit (ASIC). When processor 505 is a microprocessor then logic 505$_1$-505$_4$ can be processor-executable code loaded from memory 510.

Visual light transceivers 515 and 520 each include similar components to those illustrated in FIG. 3B. When source/sensor 550 receives visual light, the light is passed to visual light transceiver 515, which converts the light into a digital format, and synchronizes and demodulates the light signal. The demodulated signal is then passed to processor 505. Logic 505$_1$ converts the demodulated digital signal into a baseband signal, logic $505_2$ decodes the baseband signal, and logic $505_3$ converts the signal back into a visual light communication signal. This signal is then passed to visual light transceiver 520, which transmits the signal using light source/sensor 555. Depth control logic $505_4$ controls the depth of the active light relay in connection with depth controller in a similar manner to that described above with regard to VLC-Acoustic gateway 150.

Although FIG. 5 illustrates two light sources/sensors 550 and 555 and two visual light transceivers 515 and 520, the active light relay 120 can include a single light source/sensor and a single visual light transceiver. Furthermore, active light relay can employ more than two light sources/sensors.

Figure 6:
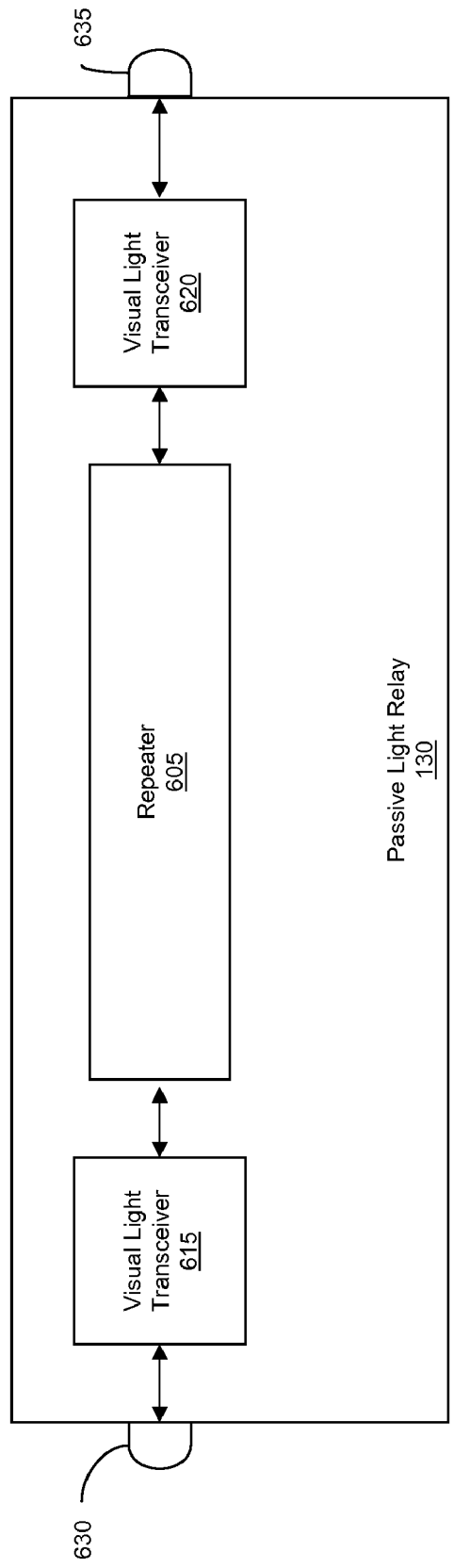
FIG. 6 is a block diagram of an exemplary passive relay in accordance with the present invention.

FIG. 6 is a block diagram of an exemplary passive light relay in accordance with the present invention. The passive light relay 130 includes a repeater 405 coupled between two visual light transceivers 615 and 620. Visual light transceiver 615 is also coupled to light source/sensor 630, and visual light transceiver 620 is also coupled to light source/sensor 635.

Visual light transceivers 615 and 620 can each be arranged in the manner illustrated in FIG. 3B. Accordingly, unlike the active light relay, the passive light relay does not process the received visual light communication signals, but instead merely repeats the received signals. Repeater 605 can, if necessary, increase the level of the visual light communication signal prior to repeating it to the next network component. In addition, or as an alternative, to the passive light relay illustrated in FIG. 6, a passive light relay that consists of only one or more mirrors can be employed. The mirrors are arranged to receive visual light communication signals from one network component and reflect the signals to the next network component. Although FIG. 6 illustrates two light sources/sensors 630 and 635, the passive light relay 130 can include a single light source/sensor or more than two light sources/sensors.

Figure 7A:
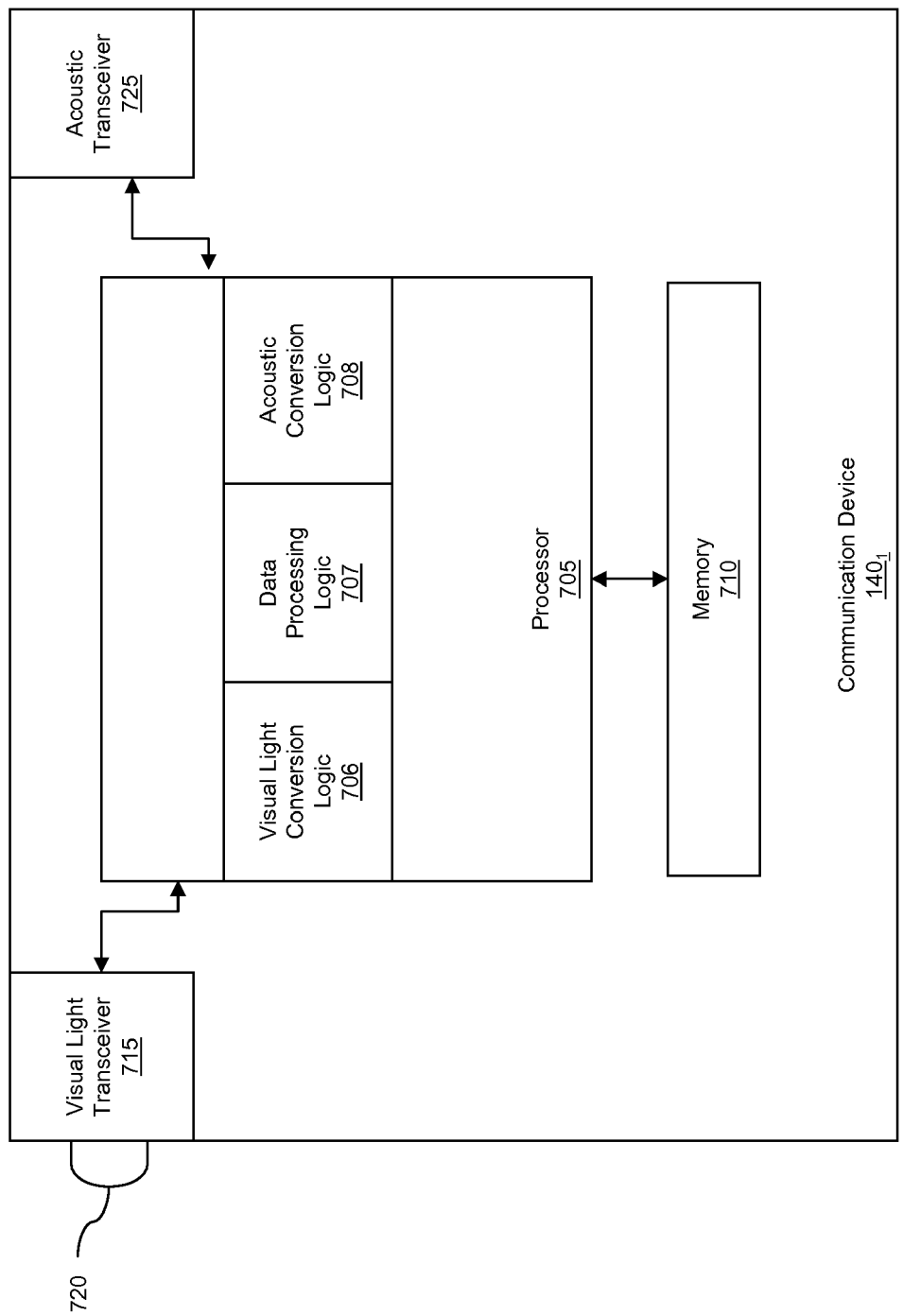
FIGS. 7A and 7B are block diagrams of exemplary communication devices in accordance with the present invention.
Figure 7B:
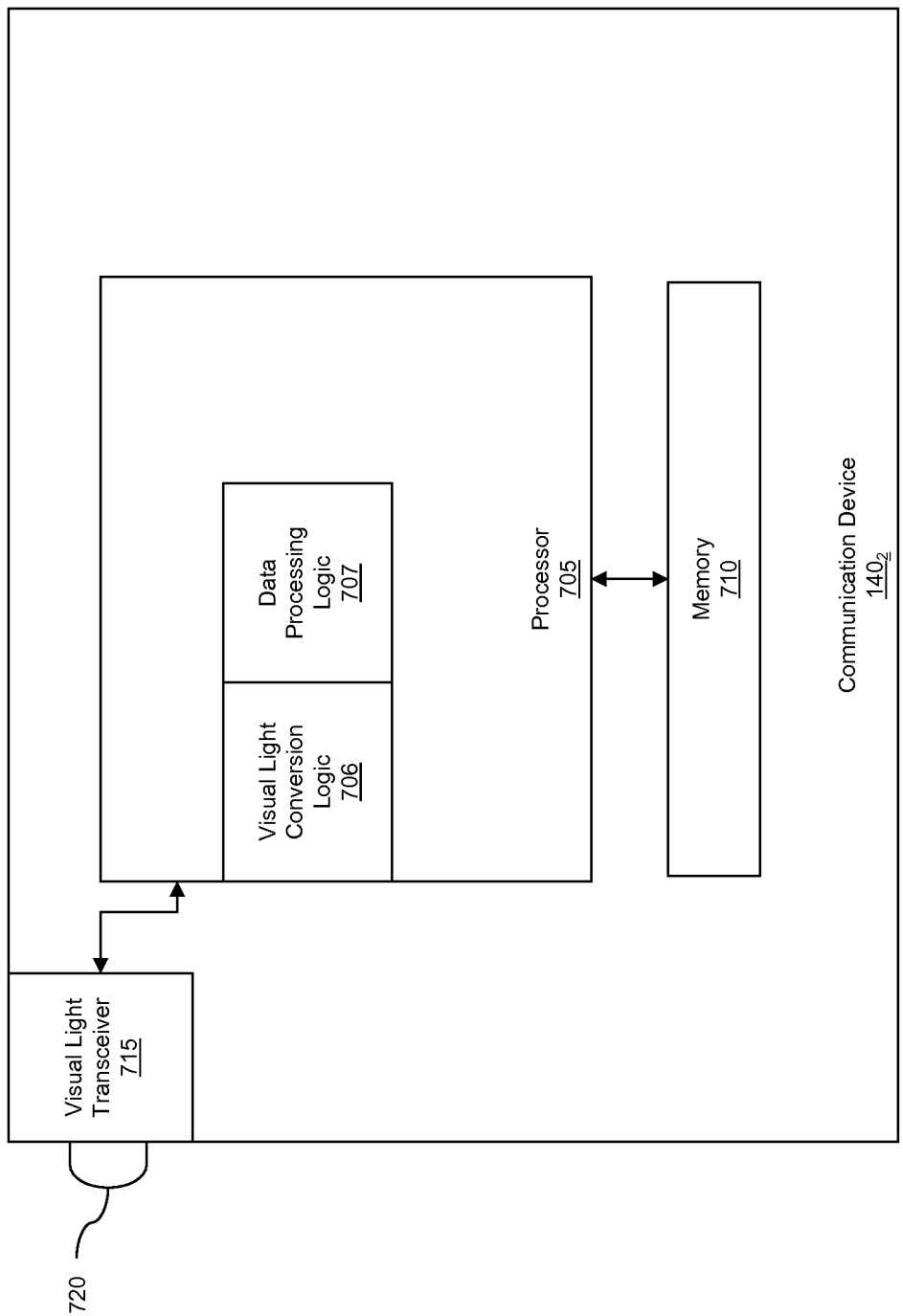

FIGS. 7A and 7B are block diagrams of exemplary communication devices in accordance with the present invention. The communication device $140_1$ of FIG. 7A is capable of communicating using visual light and/or acoustic signals, whereas the communication device $140_2$ is capable of communicating using only visual light. Specifically, communication device $140_1$ includes a light source/sensor 720 coupled to a visual light transceiver 715, which includes similar components to those illustrated in FIG. 3B. Visual light transceiver 715 is coupled to processor 705, which is also coupled to memory 710. For acoustic communications, acoustic transceiver 725 is coupled to processor 705.

Processor 705 of communication device $140_1$ includes visual light conversion logic 706 for processing visual light signals received by visual light transceiver 715, acoustic conversion logic 708 for processing signals received by acoustic transceiver 725, and logic 707 for processing the decoded data provided by logic 706 and/or 708. Communication device $140_2$ can be embodied in a variety of different packaging. For example, communication device $140_2$ can be a component of a head lamp or handheld lamp, such as those commonly used by divers.

Although exemplary embodiments of the present invention have been described in connection with an underwater environment, the present invention can be implemented in other environments. For example, the visual light communication-acoustic gateway can exchange communications using visual light or acoustic signals in an air interface environment.

It should be recognized that the various functions described above as being performed by different elements can be combined into a single element. For example, the master control station can include components for visual light communication and/or VLC-RF gateway 110 can include components for acoustic communication. Moreover, master control station 102, VLC-RF gateway and/or VLC-Acoustic gateway 150 can include a wired connection (e.g., fiber optic) to an external communication network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system, comprising:
    a master control station arranged to transmit communications using wired and wireless communication mediums;
    an acoustic relay arranged to exchange communication signals with the master control station using the wired communication medium and to convert the communication signals into acoustic communication signals;
    a first gateway arranged to convert radio frequency communications received from the master control station into visual light communication signals;
    a second gateway arranged to convert visual light communication signals into acoustic signals and acoustic signals into visual light communication signals, the second gateway includes a processor that comprises
        communication medium impairment logic to determine an amount of impairment of the communication medium;
        communication medium selection logic to select one of visual light communication and acoustic communication based on the determined amount of impairment; and
    a communication device arranged to exchange visual light communication signals with one of the first and second gateways.

2. The communication system of claim 1, further comprising:
    an active light relay, wherein the active light relay is arranged to exchange communication signals with one of the first gateway, second gateway and communication device.

3. The communication system of claim 2, wherein the active light relay comprises:
    a depth controller; and
    a processor, coupled to the depth controller, the processor includes depth control logic arranged to receive a depth control signal and provide control signals to the depth controller to control a depth of the active light relay.

4. The communication system of claim 1, further comprising:
    an passive light relay, wherein the passive light relay is arranged to exchange communication signals with one of the first gateway, second gateway and communication device.

5. The communication system of claim 1, wherein the first and second gateways each include a light source which produces visual light that illuminates surroundings of the respective gateway and transmits the visual light communication signals.

6. The communication system of claim 1, wherein the master control station and first gateway are arranged with a portion above water, and the acoustic relay, second gateway and communication device are arranged under the water.

7. The communication system of claim 1, wherein the communication device is also arranged to exchange acoustic communication signals with the acoustic relay.

8. The communication system of claim 1, wherein the first gateway comprises:
- a radio frequency transceiver arranged to receive radio frequency communications;
- a visual light transceiver arranged to transmit visual light communication signals; and
- a processor, coupled between the radio frequency transceiver and the visual light transceiver, arranged to convert communications between radio frequencies and visual light.

9. The communication system of claim 8, wherein the processor of the first gateway comprises:
- radio frequency conversion logic to convert radio frequency signals into baseband signals;
- decoding logic to decode the baseband signals; and
- visual light conversion logic to convert the decoded baseband signals into visual light signals.

10. The communication system of claim 1, wherein the second gateway comprises:
- an acoustic transceiver arranged to receive acoustic communications; and
- a visual light transceiver arranged to transmit visual light communication signals,
- wherein the processor is coupled between the acoustic transceiver and the visual light transceiver and is arranged to convert communications between acoustic signals and visual light.

11. The communication system of claim 10, wherein the processor of the second gateway comprises:
- acoustic conversion logic to convert acoustic signals into baseband signals;
- decoding logic to decode the baseband signals; and
- visual light conversion logic to convert the decoded baseband signals into visual light signals.

12. The communication system of claim 1, wherein the master control station comprises:
- a radio frequency transceiver arranged to exchange wireless communication signals with the first gateway;
- a wired transceiver arranged to exchange wired communications with the acoustic relay; and
- a processor coupled between the radio frequency transceiver and the wired transceiver.

13. The communication system of claim 12, wherein the processor of the master control station comprises:
- communication medium impairment logic to determine an amount of impairment of a water communication medium;
- communication medium selection logic to select one of the radio frequency transceiver and the wired transceiver for exchanging communication signals based on the determined amount of impairment.

14. A master control station comprising:
- a radio frequency transceiver arranged to exchange wireless communication signals with a first gateway;
- a wired transceiver arranged to exchange wired communications with a acoustic relay; and
- a processor coupled between the radio frequency transceiver and the wired transceiver, the processor of the master control station comprising
  - communication medium impairment logic to determine an amount of impairment of a water communication medium;
  - communication medium selection logic to select one of the radio frequency transceiver and the wired transceiver for exchanging communication signals based on the determined amount of impairment.

15. A communication gateway comprising:
- an acoustic transceiver arranged to receive acoustic communications;
- a visual light transceiver arranged to transmit visual light communication signals; and
- a processor, coupled between the acoustic transceiver and the visual light transceiver, arranged to convert communications between acoustic signals and visual light, the processor comprising
  - communication medium impairment logic to determine an amount of impairment of the communication medium;
  - communication medium selection logic to select one of visual light communication and acoustic communication based on the determined amount of impairment.

16. The communication gateway of claim 15, wherein the processor comprises:
- acoustic conversion logic to convert acoustic signals into baseband signals;
- decoding logic to decode the baseband signals; and
- visual light conversion logic to convert the decoded baseband signals into visual light signals.

17. The communication gateway of claim 15, wherein the processor comprises:
- depth control logic arranged to receive a depth control signal and provide control signals to a depth controller to control a depth of the communication gateway.

18. A communication system, comprising:
- a master control station arranged to transmit communications using wired and wireless communication mediums, the master control station includes a processor that comprises
  - communication medium impairment logic to determine an amount of impairment of the communication medium;
  - communication medium selection logic to select one of visual light communication and acoustic communication based on the determined amount of impairment;
- an acoustic relay arranged to exchange communication signals with the master control station using the wired communication medium and to convert the communication signals into acoustic communication signals;
- a first gateway arranged to convert radio frequency communications received from the master control station into visual light communication signals;
- a second gateway arranged to convert visual light communication signals into acoustic signals and acoustic signals into visual light communication signals; and
- a communication device arranged to exchange visual light communication signals with one of the first and second gateways.

* * * * *